May 11, 1926.

J. J. KILLIP 1,584,553

AWNING FOR AUTOMOBILES

Filed Jan. 5, 1925   2 Sheets-Sheet 1

J. J. Killip,
Inventor

By
Attorney

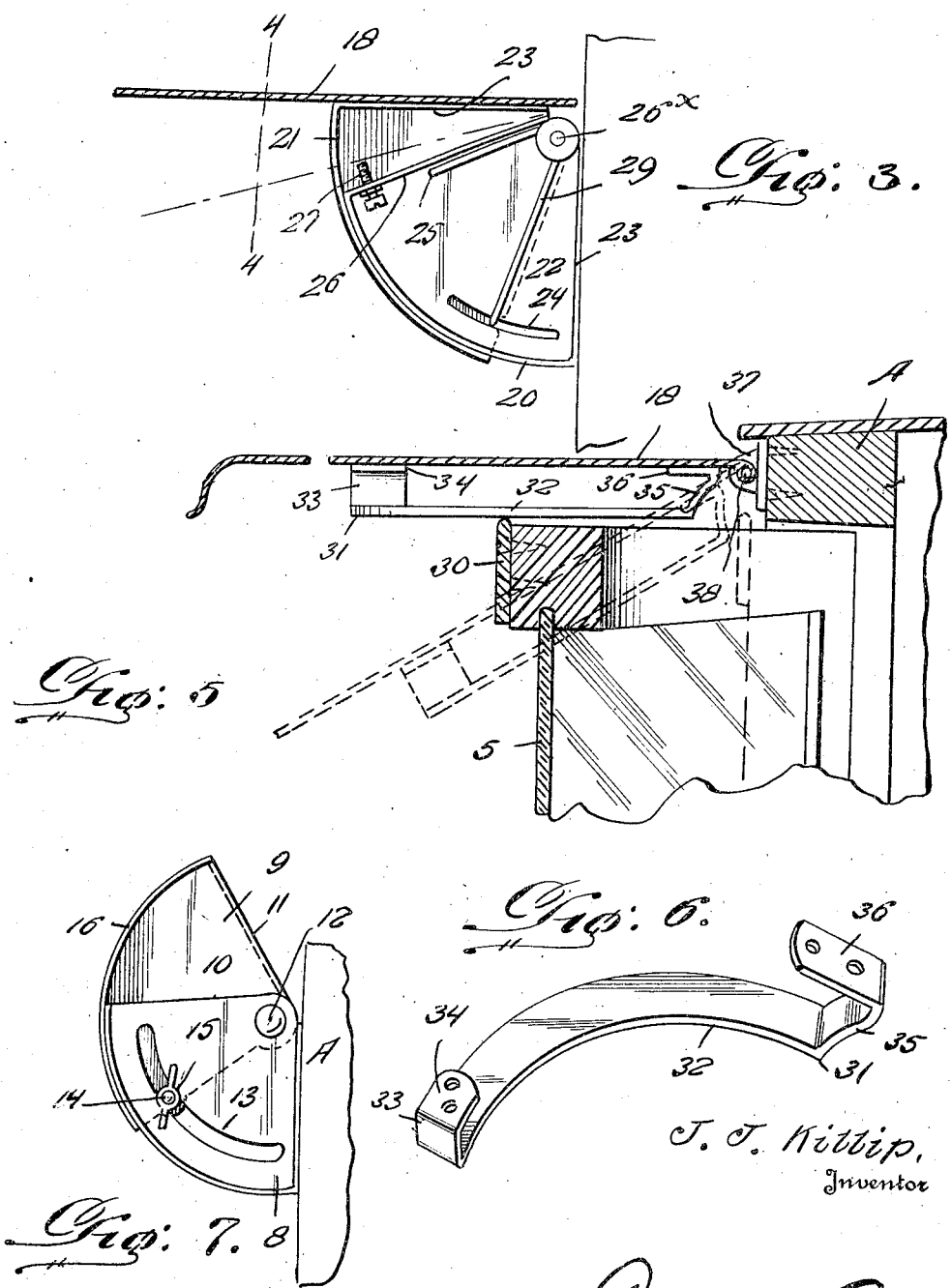

Patented May 11, 1926.

1,584,553

UNITED STATES PATENT OFFICE.

JOHN J. KILLIP, OF ASTORIA, OREGON.

AWNING FOR AUTOMOBILES.

Application filed January 5, 1925. Serial No. 593.

The present invention relates to awnings for automobiles, designed particularly for use with cars of the closed type.

It is the principal object of the present invention to provide awnings on the sides of closed cars to eliminate the glare of the sun.

Another important object of the invention is to provide such awnings with means whereby they may be adjusted so as to be positioned in various desired angles in relation to the car as may be desired.

Another very important object of the invention is to provide awnings which may be mounted on the side of the car over the door thereof, and in no way interfere with the operation of the door.

Another specific object of the invention is to provide means in conjunction with the awnings disposed over the doors of the cars, whereby they will be hinged to an out-of-the-way position, as the door is opened.

Another object of the invention is to provide buffer means with the awnings over the car doors, so that as the doors are closed, the shock of the awnings returning to their normal positions will be absorbed.

A still further object of the invention is to provide awnings of this nature, possessed of extremely simple, yet efficient structure, which is reliable, attractive in appearance, inexpensive to construct and install, strong, durable, and otherwise well adapted for the purpose for which they are designed.

With the above and numerous other objects in view, as will appear as the description proceeds, the invention resides in certain novel features of construction, and in the combination and arrangement of parts as will be hereinafter more fully described and claimed.

In the drawings:

Figure 3 is a vertical section, taken on the line 3—3 of Figure 2.

Figure 5 is a detail vertical section, showing the door of the automobile in a partially open position, with the awning raised thereby.

Figure 6 is a detail perspective of the door engaging track.

Figure 7 is a side elevation of one of the hinges used in connection with the rear awnings.

Figure 1:
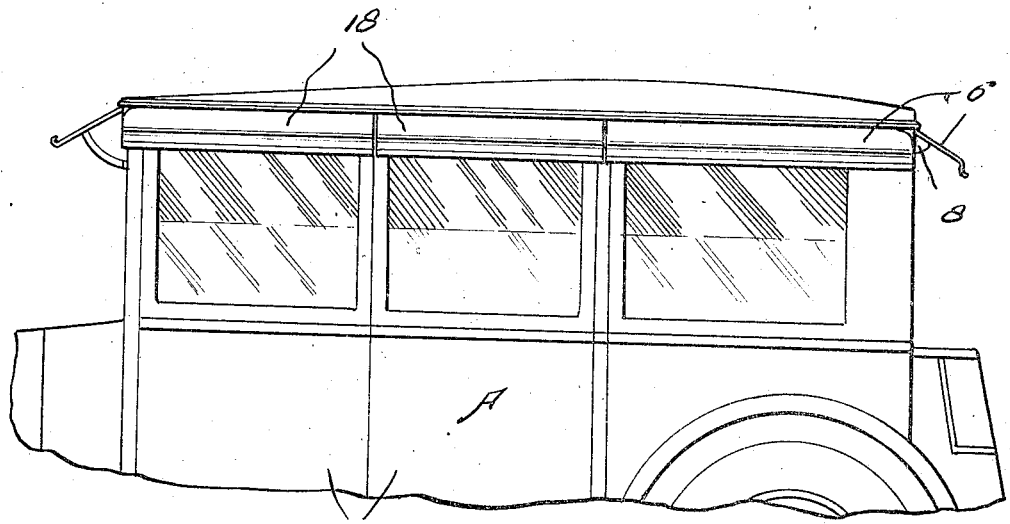
Figure 1 is a fragmentary elevation of a closed automobile, showing my improved awnings associated therewith.
Figure 2:
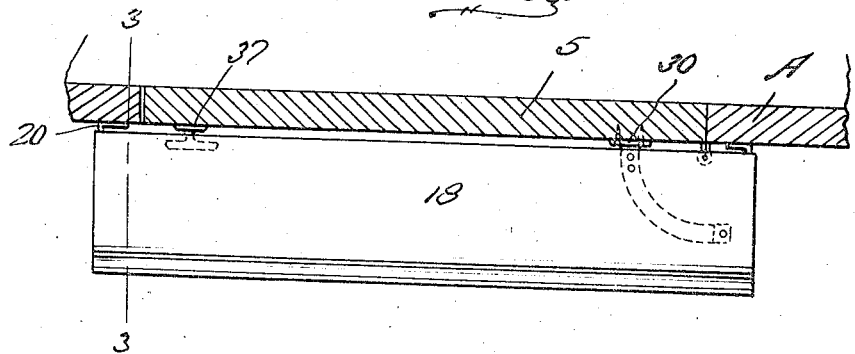
Figure 2 is a detail horizontal section through the automobile above one door thereof, showing the associated awning in top plan.

Referring to the drawings in detail, it will be seen that the automobile disclosed generally at A is of the closed type, including the usual doors 5. My improved awnings are shown arranged alongside of the automobile adjacent the top thereof both on the sides and at the rear.

The awnings used at the rear and on the sides adjacent the rear of the automobile are identical in construction, and one of them will be described in detail. The awning 6, itself may be of any desired structure, and formed of any suitable material. The awnings 6 are each preferably in the form of an elongated plate, which is hinged to the automobile body, adjacent the top. One of the hinges used for this purpose is illustrated to advantage, in Figure 7 of the drawing. This hinge includes a fixed leaf 8, and a movable leaf 9. Both leaves consist of plate bodies 10, having straight flanges 11, which are attached respectively to the awning 6 and the body of the automobile. The body plates 10 are pivoted together by means of a suitable pin 12, and one of the plates is provided with an arcuate slot 13, while the other plate has a bolt 14 projecting through this slot, and a nut 15 thereon, in order that it may be tightened on the bolt and thus the plates 10 may be held in adjusted positions in relation to each other. In the present instance, the plates 10 are provided on their curved edges with curved flanges 16, one moving over the other. The awnings which are used over the doors 5 of the automobile, are indicated by the numerals 18 and are preferably constructed the same as awnings 6. The hinges used with the awnings 18, however, differ to some extent from those used with awnings 6. One of these hinges is illustrated to advantage in Figures 3 and 4 and will be described in detail. This hinge consists of the fixed leaf 20, and movable leaf 21, both of which are provided with plate bodies 22, having flanges 23 secured respectively to the awning and the body of the automobile. One of the plate bodies is provided with a slot 24, of arcuate formation, while the other is provided with an opening 25. The plates 22 are pivoted together by a suitable pin 26. The fixed leaf 20 is provided with a flange 26, through which is threaded a set screw 27 adapted to be abutted with by the flange 23 of the movable leaf 21, so that when the same is in a lowered position, the angle of the awning 18 may be adjusted. A resilient wire or other spring member 29 is suitably attached to the pin 26 and its arms extended so that one end will terminate in the opening 25 and the other end in the slot 24, thereby forming a buffer for the awning 18 as it is allowed to fall to its lowermost position, after the door has been closed, it being noted that the end portion of the arm which is disposed in the slot 24 will engage the lower end of said slot before the flange 23 of the movable leaf 21 engages the set screw 27.

Figure 4:
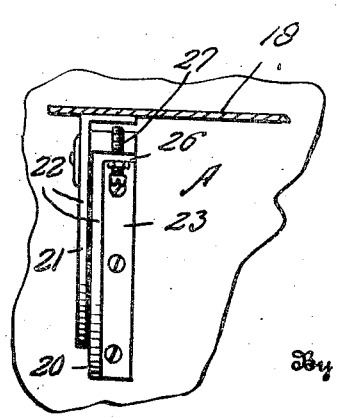
Figure 4 is a vertical section, taken substantially on the line 4—4 of Figure 3.

The door of the automobile is provided with a suitable engaging strip 30, for cooperating with a track indicated generally at 31, mounted on the under face of the awning 18. This track 31 includes a curved body 32, having a right angularly disposed extension 33 at one end terminating in an inwardly extending apertured ear 34, which may be attached to the awning. The other end of the body is provided with a curved or cam extension 35, also terminating in an inwardly disposed apertured ear 36, so as to be attached to the awning 18. The curved or cam extension 35 is disposed in close proximity to the door of the automobile. The door, when in a closed position, may be hinged to an open position, at which time the strip 30 will engage the extension 35 to swing the awning upwardly and as the door is further opened, this strip 30 will engage the body 32 of the track 31. It is to be noted that the strip 30 is slightly projected above the door. Where two doors are provided on the automobile, it is sometimes not possible to find room for the mounting of two hinges, such as are shown in Figures 3 and 4, and in such cases, any ordinary hinge device may be used, such as, for instance, is illustrated in Figure 5, wherein the fixed leaf 37 is pivoted to the awning 18, by means of a pin 38, carried in the adjacent end of the awning.

It is thought that the construction and operation of the awning should now be clearly understood without a more detailed description thereof. It is apparent that the embodiment of the invention which I have described in detail possesses all the features of advantage enumerated as desirable in the statement of the invention and the above description. It is also evident that numerous changes in the details of construction and in the combination and arrangement of parts may be resorted to, without departing from the spirit and scope of the invention as hereinafter claimed, without sacrificing any of its advantages.

Having thus described my invention, what I claim as new is:

1. In combination, an automobile body, a door hinged thereto and arranged to swing horizontally, an awning hingedly mounted on the body above the door and arranged to swing vertically and to gravitate to idle position, and means associated with the door and the awning, whereby said awning will be raised by the door as the door is opened and will be maintained in raised position by the door when the latter is in open position; the said door being provided with an upwardly projecting strip, and the said awning being provided at its side adjacent to the door with a curvilinear track opposed to and arranged to be engaged by said strip to bring about opening of the awning incident to the opening of the door.

2. In combination, an automobile body, a door hinged thereto and arranged to swing horizontally, an awning hingedly mounted on the body above the door and arranged to swing vertically and to gravitate to idle position, and means associated with the door and the awning, whereby said awning will be raised by the door as the door is opened and will be maintained in raised position by the door when the latter is in open position; the said door being provided remote from its hinged connection with an upwardly extending strip, and the said awning being provided at its side adjacent to the door with a curvilinear strip or track opposed to the strip on the door, and the said track having adjacent to the hinged connection of the awning a concaved end portion, and the said track being spaced from the side of the awning adjacent to the door.

3. In combination, an automobile body, a door hinged thereto, an awning, means for hinging the awning above the door, buffer means included in said hinged means and arranged within the hinge, means associated with the door and the awning for raising the awning as the door is opened, and means for adjusting the normal angle of the awning with respect to the body when the door is closed.

4. In combination, hinge members hingedly connected together and provided with flanges, adjustable means mounted in the flange of one hinge member and arranged in opposed relation to the flange of the other hinge member to limit the movement of the latter, and a buffer or shock absorbing spring connected with said members and having an arm arranged against the flange of one member and also having an arm arranged to cushion the movement of the other member.

In testimony whereof I affix my signature.

JOHN J. KILLIP.